United States Patent Office 3,178,375
Patented Apr. 13, 1965

---

3,178,375
ORGANOSTANNOXY TITANOXANE POLYMERS AND COPOLYMERS AND THE PROCESS OF MAKING SAME
John B. Rust and Genevieve C. Denault, Los Angeles, Calif., assignors to Hughes Aircraft Company, Culver City, Calif., a corporation of Delaware
No Drawing. Filed June 27, 1960, Ser. No. 38,764
14 Claims. (Cl. 260—2)

The present invention relates to stannoxytitanoxane and stannoxystannotitanoxane polymers of outstanding thermal stability, and especially to such polymers and copolymers having organo-substituted stannoxy side groups, and to the process of making same.

Titanoxane polymers have been described in the prior art, having been produced by the careful hydrolysis of titanium orthoesters to form polymers having the structure:

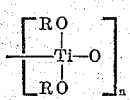

where the R groups are alkyl, aryl, and the like. However, the RO groups of these polymers are easily subject to further hydrolysis to yield crosslinked materials and to finally yield titanium dioxide itself. In fact, even during the careful hydrolysis step required to prepare the initial polymer, crosslinking extensively occurs because of the equivalent reactivity of each of the RO groups and of the randomness of the hydrolysis process. Still other disclosures have been made of the hydrolysis of mixed esters:

$$(RO)_2Ti(OR')_2$$

to produce polymers, where R is the radical of a low boiling, easily hydrolyzable alcohol and R' is the radical of a high molecular weight substantially hydrophobic alcohol group. There are also disclosures which describe the hydrolysis of titanium chelate esters and acylates to produce polymers of the same general type described above.

It is an important object of this invention to provide organostannoxytitanoxane polymers and copolymers of controlled structure and outstanding thermal stability.

Another object of this invention is to provide a method for making titanoxane polymers and copolymers having organo-substituted stannoxy side groups.

A further object of this invention is to provide a group of resinous compositions of controlled structure and molecular weight and reproducible thermal and mechanical properties.

The present invention is primarily concerned with our discovery that the grouping Sn—O—Ti can be secured by certain synthetic methods and that this same grouping possesses great thermal stability. We have, furthermore, found that certain synthetic reactions lead to the formation of high polymers containing this Sn—O—Ti grouping. These high polymers are capable of being utilized in compositions which can be used for the fabrication of components. These components possess a range of usefulness in electronic parts in systems which must operate in unnatural environments, such as environments characterized by the presence of high thermal flux.

The polymers of this invention are prepared from well-defined intermediates or mixtures of intermediates. Some of these intermediates can be represented by the following general formula:

$$(R_3SnO)_nTi(OR')_{4-n}$$

and can conveniently be produced by the following general reaction:

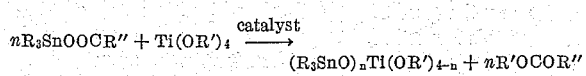

where $n$ equals 1, 2 or 3 and R and R' represent alkyl, aryl, aralkyl, alkaryl or mixed alkyl and aryl radicals. Thus R and R' can be methyl, ethyl, propyl, butyl, isopropyl, sec. butyl, hexyl, and the like; or phenyl, phenylene, naphthyl, diphenyl, ethyl phenyl and so forth; or benzyl, methyl benzyl, α-phenyl ethyl, β-phenyl ethyl, α-phenyl propyl and the like. The combination of R' and R" should be such as to produce an ester R'OCOR" which is substantially volatile and can be removed from the reaction medium, if desired, at reasonable temperatures and under normal or reduced pressures. Thus R' and R" each should preferably contain less than about eight carbon atoms per radical. The intermediates represented by the above general formula are capable of participating in polymer formation if the value of $n$ is from one to three. In the case where $n=4$, the compound is tetrakis(triorganostannoxy)titane, and this material cannot, under normal circumstances, be used in the polymer forming reactions hereinafter described. However, under certain conditions of catalysis and stringent hydrolysis, partial cleavage of the stannoxy groups can be induced which then leads to resin formation. Where $n=3$ in the general formula, the compound is tris(triorganostannoxy) alkoxy titane which functions as a chain stopper in the polymerization reactions. For the case where $n=2$, the intermediate yields linear polymers upon appropriate reaction and where $n=1$, further reaction to form a polymer results in crosslinked structures. For some purposes it is desirable to isolate the intermediates in a pure condition so that unequivocal polymer structures can be produced on further reaction. However, in certain practical utilizations of the polymers of this invention, they can be prepared directly by further reaction of the crude or unrefined mixtures of intermediates which results from the reaction indicated above. The use of such a mixture of intermediates results in a polymer whose structure can be conceived of as the statistical average of those structures proposed hereinafter. As an illustration: if one molar proportion of titanium orthoester is reacted with two molar proportions of a triorgano acyloxy stannane, a small amount of unreacted material is produced along with a small amount of triorganostannoxy trialkoxy titane. The major product is bis(triorganostannoxy)dialkoxy titane accompanied by some small amounts of the two intermediates where $n=3$ and 4, respectively. Reaction of this mixture to form polymers and copolymers results in high molecular weight materials which are substantially linear in structure.

Although the above reaction is preferred for the preparation of the intermediates of this invention because of its ease of execution and substantially high yields, other methods can be employed. These other methods are not as generally applicable as the acyloxy-alkoxy reaction described above, but can be utilized in special cases. These other methods include the following type reactions:

(1) Alkoxy-halide; halide-alkoxy
(2) Acyloxy-halide; halide-acyloxy
(3) Sodium salt-halide
(4) Acyloxy-acyloxy
(5) Sodium salt-acyloxy
(6) Alkoxy-acyloxy where the first terms above designate the substituents on the stannane and second terms the substituents on the titane.

The intermediates described above can be polymerized by several methods to produce the polymers of the present inventon. When purified intermediates are used, polymers of unequivocal structure are secured. When the unpurified intermediates are employed, polymers whose structures are the average over all postulated structures are obtained. Although the methods which we describe below are the preferred methods of producing the polymers of this invention, other procedures can be employed. Choosing the intermediate bis(triorganostannoxy)diisopropoxytitane as illustrative, the following series of reactions typify the methods of producing the polymers of this invention.

(Method I)

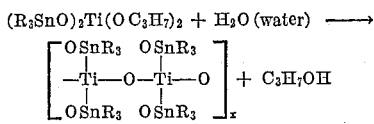

(Method II)

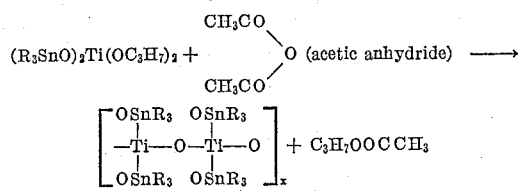

(Method III)

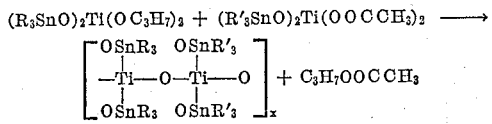

(Method IV)

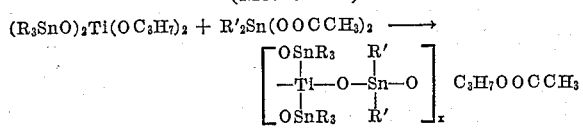

The use of Methods I and II yields stannoxytitanoxane polymers as does also Method III, if R and R' are the same radical. Copolymers can be produced by using Methods III and IV. In the case of Method III side chain copolymers result when R' is a different radical than R, whereas with Method IV chain copolymers are obtained and R and R' may be the same or different radicals.

All of the above reactions, including those used to prepare the intermediates, can be carried out both with and without catalysts. When catalysts are not employed, the reactions are best conducted at elevated temperatures and, where the conditions warrant, under pressure in an autoclave. As catalysts for the reactions, alkali metal alcoholates have been shown to be effective, but other ester-interchange catalysts can also be employed.

By judicious choice of reaction conditions block copolymers or block polymers can be prepared by the further reaction of the polymers described above with other polymeric materials having end groups reactable with the polymers of this invention. The stannoxytitanoxane polymers of this invention are capable of forming linear polymers whose properties range from liquid to thermoplastic solids depending upon the degree of polymerization and upon the character of the triorganosubstituted stannoxy side chain. The polymers that have been illustrated above are, in general, in this category. Triorganostannoxy trialkoxytitane can be used to produce crosslinked polymers. These crosslinked polymers can also be produced directly by hydrolysis according to Method I or they can be produced as fusible polymers by Methods II, III, and IV and hydrolyzed later to yield tightly crosslinked solids useful as laminating, molding and varnish resins, and to yield lightly crosslinked materials suitable for varnishes, embedding or elastomeric resins.

Polymers of the present invention can be used alone or in a mixture with fillers and reinforcing agents, the proper choice depending upon the end use of the composition. As fillers, there can be used glass fibers, asbestos, clays, pigments such as iron oxide, zinc oxide, litharge, titanium dioxide and so forth. Although the compositions of this invention can be advanced or cured by the application of heat, catalysts can be employed such as metallic salts of carboxylic acids, quaternary ammonia salts, metallic oxides, organic peroxides and the like.

The products of this invention which contain reactive end groups can be used to great advantage to prepare modifications of a variety of resinous materials of enhanced thermal properties, mechanical strength at elevated temperatures, weathering resistance and the like. The reactive end groups of our polymers are capable of reacting with alcohol and acid groups on resinous products such as alkyd resins, phenolic hydroxyl groups, esters by interchange, drying oil fatty acids, silicone hydroxyl groups, amine groups, and epoxy groups as well as with many other reactive sites on other polymer molecules. By reacting with these resinous compositions, the polymers of this invention become a chemical part of the resinous composition, and thus impart desirable and unique properties to these modified compositions.

The following examples are given to illustrate polymers and compositions of this invention, the process of making the intermediates and the polymers, and the use of the polymers. These examples are not to be construed as limiting the scope of this invention in any manner.

*Example 1*

To a three-necked flask equipped with a heating mantle, magnetic stirrer, thermometer, and reflux condenser were added 69.7 grams (0.2 mole) of tributylacetoxy stannane and 28.4 grams (0.1 mole) of freshly distilled tetraisopropyl titanate ($N_D^{25}$ 1.4606). The mixture was heated and became clear. The temperature was maintained at 93° C. for 7 hours. Then a sodium ethylate catalyst made by dissolving 0.3 gram of metallic sodium in 3.96 grams of ethanol was added and heating continued at 70° C. for 14 hours. The temperature was increased and a distillate consisting essentially of isopropylacetate was collected in the amount of 19.6 grams. This amount was equivalent to 96 percent of theory for the isopropyl acetate available. The resulting reaction product was a tan, very viscous, resinous material consisting substantially of bis(tributylstannoxy)diisopropoxy titane.

*Example 2*

To 20.0 grams of the bis(tributylstannoxy)diisopropoxy titane of Example 1, dissolved in 100 ml. of toluene was added 20 ml. of water. The mixture was stirred and heated for four hours to about 90° C. The reaction mixture was then placed under a reflux condenser with a Dean-Stark trap and the water removed over a period of eight hours at reflux temperature. A clear solution containing 16 percent solids was secured. The stannoxytitanoxane polymer contained in the solution was a hard fusible, soluble, pale colored solid.

*Example 3*

To 19.4 grams of the bis(tributylstannoxy)diisopropoxy titane of Example 1, dissolved in 50 ml. of toluene was added 2.55 grams of acetic anhydride and the solution heated under reflux for eight hours. A slight exothermic reaction was noted on first adding the acetic anhydride. The reflux condenser was set for distillation and the reaction mixture heated. Volatile material distilled out over a period of eight hours leaving a hard, waxy, pale-colored stannoxytitanoxane polymer which was fusible. The stannoxytitanoxane polymer gave a slightly cloudy solution in toluene, dimethylformamide, tetrahydrofuran, and cyclohexane, and could be cured to a hard, intractable, amber-colored material upon further heating.

Example 4

To 50.5 grams of the bis(tributylstannoxy)diisopropoxy titane of Example 1, was added 22.8 grams of dibutyl diacetoxy stannane and the reaction mixture was heated to 110° C. under reflux with stirring for six hours. The condenser was set for distillation and the reaction mixture heated while a distillate was collected. The residual material was a waxy pale colored, fusible solid partially soluble in toluene and consisted substantially of a stannoxy stannotitanoxane polymer.

Example 5

To a three-necked flask was added 69.7 grams (0.2 mole) of tributyl acetoxy stannane, 28.4 grams (0.1 mole) of tetraisopropyl titanate and a sodium ethylate solution consisting of 0.3 gram of sodium in 4 grams of ethanol. The reactants were heated to 63° C. when a homogeneous solution was obtained. After heating for six hours, isopropyl acetate, as determined by refractive index ($N_D^{25}$ 1.3750), was removed by distillation. The reaction flask was placed under reduced pressure and a product, the bulk of which distilled at 99–101° C./1.5 mm., was obtained as a clear water, white liquid that crystallized as it cooled. This product was bis(tributylstannoxy)diisopropoxy titane.

What is claimed is:

1. A process for producing a triorganostannoxy substituted titanium compound having the general formula $(R_3SnO)_nTi(OR')_{4-n}$ comprising reacting a tetrakis (alkoxy) titanium having the general formula $(R'O)_4Ti$ with a triorganioacyloxy stannane having the general formula $R_3SnOOCR''$, wherein R is a hydrocarbon radical selected from the class consisting of alkyl, aryl, aralkyl and alkaryl, wherein R' and R'' are hydrocarbon alkyl radicals and $n$ takes an integral value in the range of about 1 to 4.

2. A process for producing a triorganostannoxy titanium compound having the general formula $$(R_3SnO)_nTi(OR')_{4-n}$$

comprising reacting a tetra-alkyl titanate having the general formula $(R'O)_4Ti$ with a triorgano acyloxystannane having the general formula $R_3SnOOCR''$ in the presence of a sodium alkoxide catalyst, wherein R is a hydrocarbon radical selected from the class consisting of alkyl, aryl, aralkyl and alkaryl, wherein R' and R'' are hydrocarbon alkyl radicals and $n$ takes an integral value in the range of about 1 to 4.

3. A triorganostannoxy titanium compound having the general formula $(R_3SnO)_nTi(OR')_{4-n}$ wherein R is a hydrocarbon radical selected from the class consisting of alkyl, aryl, aralkyl and alkaryl, wherein R' is a hydrocarbon alkyl radical and $n$ takes an integral value in the range of about 1 to 4.

4. A process for the production of triorganostannoxy substituted titanium oxide polymer comprising reacting by organic ester elimination a triorganostannoxy alkoxy titanium compound having the general formula $$(R_3SnO)_nTi(OR')_{4-n}$$

with a compound selected from the group consisting of organic acid anhydride and triorganostannoxy acyloxy titanium derivative having the general formula $$(R_3''SnO)_mTi(OOCR''')_{4-n}$$

wherein R and R'' are hydrocarbon radicals selected from the class consisting of alkyl, aryl, aralkyl, and alkaryl, wherein R' and R''' are hydrocarbon alkyl radicals and $m$ and $n$ take an integral value in the range of about 1 to 2.

5. A triorganostannoxy titanium oxide polymer produced by the process of claim 4.

6. A process for the production of triorganostannoxy substituted titanium oxide-organotin oxide polymer comprising reacting by organic ester elimination a triorganostannoxy alkoxy titanium compound having the general formula $(R_3SnO)_nTi(OR')_{4-n}$ with an organotin acylate having the general formula $R''_mSn(OOCR''')_{4-m}$ wherein R and R'' are hydrocarbon radicals selected from the class consisting of alkyl, aryl, aralkyl, and alkaryl, wherein R' and R''' are hydrocarbon alkyl radicals and $m$ and $n$ take an integral value in the range of about 1 to 2.

7. A triorganostannoxy titanium oxide-organotin oxide polymer produced by the process of claim 6.

8. Bis(tributylstannoxy) diisopropoxy titane.

9. The process of producing bis(tributylstannoxy) diisopropoxy titane comprising reacting tributyl acetoxy stannane and tetraisopropyl titanate in the presence of sodium ethoxide catalyst.

10. The process of producing triorganostannoxy substituted titanium oxide polymer comprising reacting by organic alcohol elimination bis(tributylstannoxy) diisopropoxy titane with water.

11. The process of producing triorganostannoxy substituted titanium oxide polymer comprising reacting by organic ester elimination bis(tributylstannoxy) diisopropoxy titane and acetic anhydride.

12. A triorganostannoxy titanium oxide polymer comprising the reaction product of bis(tributylstannoxy) diisopropoxy titane with acetic anhydride.

13. The process of producing triorganostannoxy substituted titanium oxide-organotin oxide polymer comprising reacting by organic ester elimination bis(tributylstannoxy) diisopropoxy titane and dibutyl diacetoxy stannane.

14. A process for the production of a triorganostannoxy substituted titanium oxide polymer comprising reacting by organic alcohol elimination a triorganostannoxy alkoxy titanium compound having the general formula $$(R_3SnO)_nTi(OR')_{4-n}$$

with water, wherein R is a hydrocarbon radical selected from the class consisting of alkyl, aryl, aralkyl and alkaryl, R' is a hydrocarbon alkyl radical and $n$ takes an integral value in the range of about 1 to 2.

References Cited by the Examiner
UNITED STATES PATENTS 2,592,926  4/52  Mack _____ 260—2
2,980,719  4/61  Haslam _____ 260—429.5

WILLIAM H. SHORT, *Primary Examiner.*

MILTON STERMAN, H. N. BURSTEIN, J. R. LIEBERMAN, *Examiners.*